March 7, 1933.  V. BENDIX  1,900,091
CONDUIT
Filed July 8, 1929   2 Sheets-Sheet 1

INVENTOR
Vincent Bendix
BY H. O. Clayton
ATTORNEY

March 7, 1933.  V. BENDIX  1,900,091
CONDUIT
Filed July 8, 1929   2 Sheets-Sheet 2
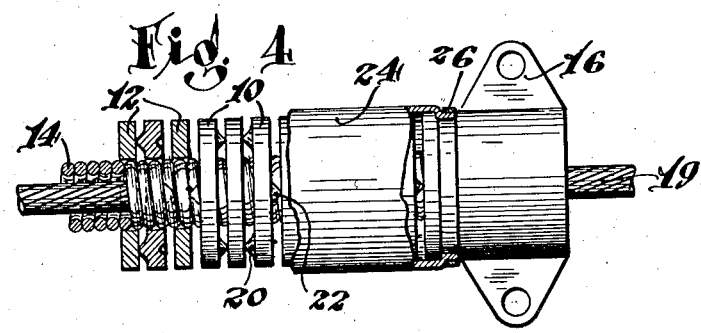
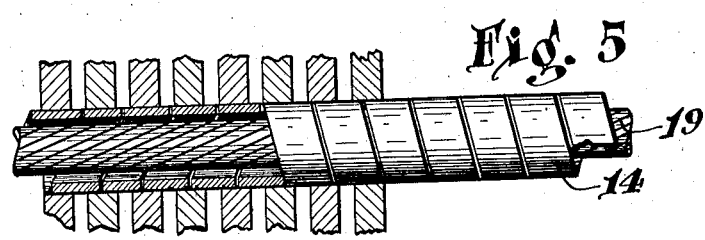
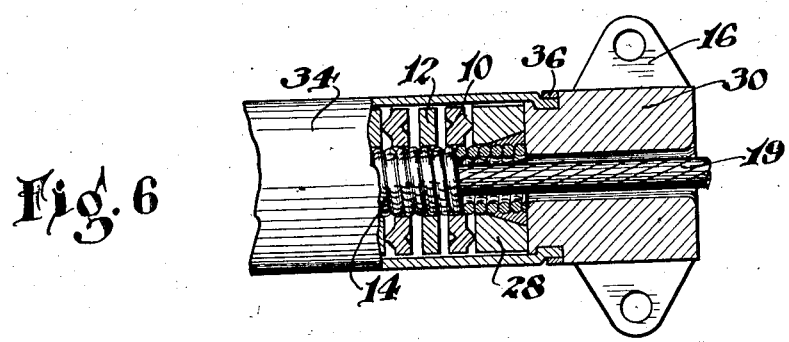
INVENTOR
Vincent Bendix
BY
ATTORI Patented Mar. 7, 1933

1,900,091

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

CONDUIT

Application filed July 8, 1929. Serial No. 376,829.

This invention relates to flexible power transmission devices and more particularly to improvements in the casings of such devices.

An object of the invention is to provide a flexible conduit which houses a flexible power transmission element wherein the conduit maintains a fixed length despite its change of shape due to flexing and which functions to resist compression under the action of the power transmission element passing therethrough.

In the accomplishment of the above there is provided a flexible conduit comprising a plurality of disklike steel stampings or the like, each provided with relatively narrow embossments extending across the face thereof, or spaced diametrically aligned hemispherical embossments, and which embossed stampings are spaced by flat washer members. In the preferred embodiment, each disk is preferably provided with a relatively narrow embossment on each side face thereof, the two embossments on each disk best being at right angles to each other and the several disks and spacing washers sleeved onto a flexible inner tube type of conduit member, preferably consisting of a close wound single spiral coil spring. The several disks and washers may be threaded on to the inner tube in face to face contact between two end fittings and further covered, if desired, by a tubular casing secured to said fittings, said casing forming a lubricant chamber.

The flexible non-compressible conduit thus formed houses a flexible power transmission cable telescoped therein and I further suggest that the direction of the coils of the inner tube portion of the conduit be opposed to the direction of the strands of the cable housed thereby to thus obviate any possible locking action with the resultant frictional loss.

Further meritorious features of the invention, including a novel method of fabricating a flexible and substantially incompressible conduit and including other desirable details of construction and combination of parts will become apparent from the following detailed description of my invention disclosed in the accompanying drawings, in which:

Figure 4 is a view similar to Figure 2 showing a modified form of disk conduit member;

Figure 5 is a view showing a modified form of coiled inner conduit member; and

Figure 1:
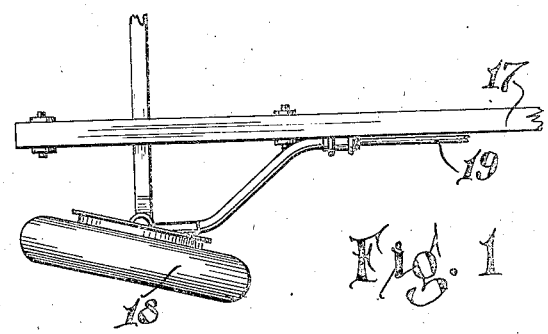
Figure 1 is a diagrammatic view showing the conduit incorporated as a part of the control for the brake of an automobile front wheel.

Figure 6 discloses one end of a modified form of conduit assembly built up in the novel manner described herein.

In the preferred embodiment of my invention, I have constructed a conduit comprising a plurality of juxtaposed dislike steel stampings 10 spaced by flat face washer members 12, both types of conduit elements being provided with substantially concentric circular openings to thread the same onto flexible inner tube type of conduit member, preferably consisting of a close spirally wound circular sectioned, high carbon steel spring 14. The spring inner tube member may, however, be of rectangular section as disclosed in Figure 5.

The outer conduit elements 10 and 12 are preferably in face to face contact with one another and are interposed in this position between tubular fittings 16 which may be secured respectively to the chassis frame 17 and brake support plate of the front wheel 18 of a motor vehicle, the inner tube member telescoping within the fittings as disclosed.

The conduit characterized by the elements 10 and 12 threaded on the coil spring or equivalent flexible tube member 14 forms a flexible non-compressible housing for the usual multi-stranded cable power transmission member 19 slidably mounted therein.

Figure 2:
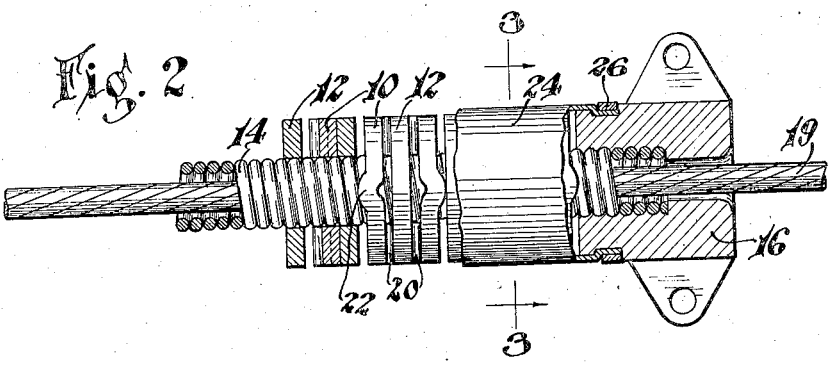
Figure 2 is a partial plan view of my novel conduit with the flexible tension element passing therethrough, parts of the conduit being shown in longitudinal section.
Figure 3:
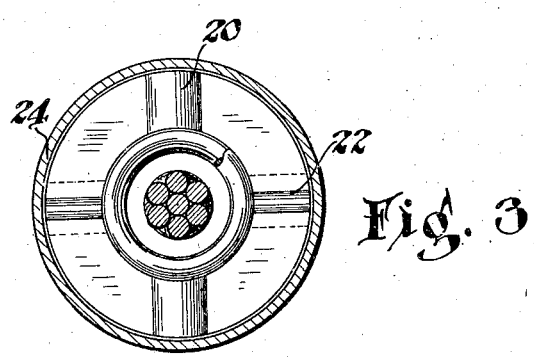
Figure 3 is a transverse enlarged sectional view taken on the line 3—3 of Figure 2, showing in detail parts of my novel conduit.

The flexible characteristics of my conduit member is obtained in part by providing elements 10 with diametrically extending relatively narrow embossments 20 and 22 spaced outwardly from the opposite side faces thereof, all as clearly disclosed in Figures 2 and 3. I prefer that the embossments extend at right angles to each other and that they present rounded outer surfaces as disclosed.

The several conduit-forming elements may be covered with a tight fitting grease retaining flexible tubular housing 24 preferably permanently secured as by a ferrule 26 to the end fittings 16. Housing 24, together with its attached end fittings and enclosed conduit elements, constitutes a sub-assembly unit which may be handled as a one-piece member. The cable is easily threaded into the conduit and the casing 24 performs the useful function of a grease retainer, as well as holding the conduit elements in fixed position.

The several elements 10 and their spacers 12 mutually cooperate, together with the flexible coiled inner tube to insure a flexing of the conduit without change of its length, the stampings 10 acting as miniature universal joints between their juxtaposed flat washers. The embossments 20 and 22 serve to permit rocking of the disks 10 on the flat faced washers 12 about axes extending in all directions parallel to the plane of the disk. This result is effected, inasmuch as the many embossed disks are freely rotatable between spacers and float, so to speak, between said spacers, no definite arrangement existing between the parts.

The coiling of the tube 14 and cable in opposite directions insures a free and unhampered movement of the cable on the member, there being no tendency for strands of the cable to lock within the crevices defined by the coils of the tube which might take place, were they wound in the same direction. The incorporation of the tube 14 with the outer conduit elements 10 and 12 also obviates a certain amount of friction which would be present, were the cable threaded directly within the outer elements. With the close coiled tube immediately surrounding the cable, the latter with the conduit flexed has a greater number of points of support than would be effected by the outer elements alone.

With tensioning of the power transmission cable, a load is placed on the normally flexed conduit, which forthwith places in compression the cable tending to straighten the conduit. It is the desideration that the conduit maintain its fixed length under such compressive strain and in the instant invention this is assured, inasmuch as the solid conduit elements always remain in contact one with another and the end elements are in constant contact with the end fittings. This action is furthermore assured, due to the fact that the conduit elements rock about transverse axes intersecting the conduit axis, the air spaces between the juxtaposed conduit elements forming pockets for the lubricant within the cover 24, which lubricant works through the tube 14 serving to reduce the friction and the resulting welding of the parts.

In Figure 6 I have disclosed a modified form of conduit assembled as follows: The stampings 10 and 12 heretofore described are first sleeved in face to face contact on the inner tube member, preferably of circular section. Washer members 28, somewhat wider than the intermediate stampings 10 and 12, are then fixedly secured as by welding to the ends of the coiled inner tube, thus forming a sub-assembly unit of the inner tube and the washers, all in tight fitting relation. End fittings 30 are then positioned in abutting relation with the end washer members and the whole secured into one unitary structure by the flexible grease-retaining cover 34 secured, as by ferrules 36, to the end fittings. I thus provide by this novel method of assembly a convenient conduit sub-assembly unit, the end fittings of which may be secured to any support parts as desired.

My novel conduit is shown incorporated in a front wheel brake control, although it is obvious that its use is not limited to such a structure for it may be employed as a housing for any flexible power transmission member wherein change of direction of the member is desired without change in length thereof between the driving and driven members secured thereto.

While several illustrative embodiments have been described in detail, it is not my intention to limit the scope of the invention to those particular embodiments or otherwise than by the terms of the appended claims.

I claim:

1. Power transmission mechanism comprising a flexible and substantially incompressible conduit including a plurality of disk members each having diametrically extending embossments, one embossment extending from each side face thereof, plain faced washer members between said embossed members, both plain and embossed members being provided with openings at their centers, and a tubular support member within said openings.

2. Power transmission mechanism comprising a flexible tubular support member, a flexible and substantially incompressible conduit including alternate disk-like stampings having diametrically aligned hemicylindrical embossments protruding from each side face of each member, plain faced washer members between said embossed members and all of said members being sleeved on the flexible tubular support member.

3. Transmission mechanism comprising a conduit comprising a coiled inner tube member, parallel stampings sleeved on said member, the end stampings thereof being rigidly secured to said inner tube member and a cover member surrounding said stampings and secured to end fittings abutting said aforementioned end stamping members.

In testimony whereof, I have hereunto signed my name.

VINCENT BENDIX.